(No Model.)
F. W. RUEFF.
FERMENTING PROCESS.
No. 481,061. Patented Aug. 16, 1892.
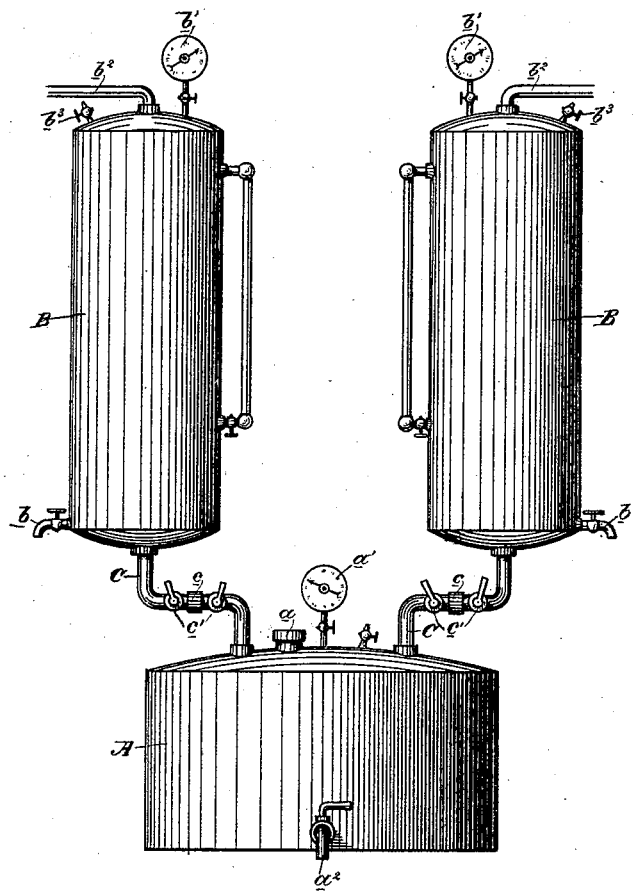
Witnesses,
Inventor,
Frederick W. Rueff
By Dewey & Co.
Attys.

United States Patent Office.

FREDERICK W. RUEFF, OF SAN FRANCISCO, CALIFORNIA.

FERMENTING PROCESS.

SPECIFICATION forming part of Letters Patent No. 481,061, dated August 16, 1892.

Application filed December 11, 1891. Serial No. 414,745. (No model.)

*To all whom it may concern:*

Be it known that I, FREDERICK W. RUEFF, a citizen of the United States, residing in the city and county of San Francisco, State of California, have invented an Improvement in Fermenting Processes; and I hereby declare the following to be a full, clear, and exact description of the same.

My invention relates to the art of fermenting; and it consists of the improved process hereinafter described, and claimed.

In the ordinary fermenting apparatus used in the manufacture of champagne, in which the fermenting-germs are kept in a separate vessel, there is no provision made for removing the vessel containing the liquid being fermented, nor is it possible to remove the germs themselves. Consequently the fermentation cannot be interrupted at any desired point, but must be continued to completeness, and it is necessary, therefore, to add more sugar to the liquid being bottled.

By my method I am enabled to arrest the fermentation at such a point as to preserve some of the original sugar, so that no more need be added. I am further enabled to draw off the old fermenting-germs at any time without stopping the fermentation.

In the ordinary process, on account of not being able to stop the fermentation at a given point the products are unequal in alcohol, sugar, and carbonic acid, and some of the fermenting-germs find their way into the bottles, even with the most careful filtering. By continuous use the yeast becomes decomposed, and no opportunity is afforded of drawing it off to clean the vessels.

By my process I am enabled to carry out a continuous operation; to remove the old germs or used yeast without interrupting the fermentation in the vessels; to stop the fermentation at any point desired without emptying the vessels; to produce products always equal in alcohol, sugar, and carbonic acid, and to obtain a clear liquid after a time of rest and cooling.

Referring to the accompanying drawing for a more complete explanation of my invention, the figure is an elevation of my apparatus.

A is a vessel to contain the fermenting-germs.

B B represent one or more (here shown as two) vessels to contain the liquid to be fermented. The vessel A has a cap-controlled filling-orifice $a$, a manometer $a'$, and a drawing-off faucet $a^2$. The vessels B have inlet and outlet faucets $b$, manometers $b'$, and cock-controlled pipes $b^2$, by which they may be connected with the carbonic-acid vessel, and suitable air-cocks $b^3$. These vessels B are each separately and removably connected with vessel A, these connections being shown by the pipes C, each containing a coupling at $c$ and controlled at each side of the coupling by cocks $c'$.

The operation is as follows: When the cocks $c'$ are opened, the liquid in vessels B is exposed to the action of the germs in vessel A and fermentation sets in. This is allowed to continue up to a point at which there is still some of the original sugar remaining in the liquid. When this point is reached, the cocks $c'$ are closed, the couplings $c$ are disjointed, and the vessels B are removed. The fermentation is then arrested by placing the vessels B in a suitable cooling device. During cooling and while bottling the liquid is subjected to a pressure of carbonic-acid gas. While these vessels B are being thus finally treated, the faucet $a^2$ is opened and the used yeast drawn off. Other vessels, such as B, containing new wine, are connected with vessel A and the process repeated. Thus my products are equal in alcohol, sugar, and carbonic acid, the fermenting germs do not get into the bottles, the fermentation can be stopped at the desired point, the vessels can be cleaned, and I do not have to use the decomposed yeast.

Having thus described my invention, what I claim as new, and desire to secure by Letters Patent, is—

The process herein described, which consists in first exposing the liquid to the action of fermenting germs contained in a separate vessel, whereby fermentation sets in; second, stopping the fermentation short of completeness by cutting off the liquid from exposure to the fermenting-germs and cooling the same, whereby it still contains sugar and is clarified, and, finally, subjecting the liquid during cooling and bottling to a pressure of carbonic-acid gas, substantially as herein described.

In witness whereof I have hereunto set my hand.

FREDERICK W. RUEFF.

Witnesses:
S. H. NOURSE,
H. F. ASCHECK.